United States Patent
Satish et al.

(10) Patent No.: US 9,680,863 B2
(45) Date of Patent: Jun. 13, 2017

(54) AUTOMATED RESPONSES TO SECURITY THREATS

(71) Applicant: Phantom Cyber Corporation, Palo Alto, CA (US)

(72) Inventors: Sourabh Satish, Fremont, CA (US); Oliver Friedrichs, Woodside, CA (US); Atif Mahadik, Fremont, CA (US); Govind Salinas, Sunnyvale, CA (US)

(73) Assignee: Phantom Cyber Corporation, Palo Alto, CA (US)

( * ) Notice: Subject to any disclaimer, the term of this patent is extended or adjusted under 35 U.S.C. 154(b) by 0 days.

(21) Appl. No.: 14/674,679

(22) Filed: Mar. 31, 2015

(65) Prior Publication Data

US 2016/0164916 A1 Jun. 9, 2016

Related U.S. Application Data

(60) Provisional application No. 62/087,025, filed on Dec. 3, 2014, provisional application No. 62/106,830, filed on Jan. 23, 2015, provisional application No. 62/106,837, filed on Jan. 23, 2015.

(51) Int. Cl.
*H04L 29/06* (2006.01)
*G06F 21/55* (2013.01)
*G06F 17/30* (2006.01)
*H04L 12/851* (2013.01)

(52) U.S. Cl.
CPC .... *H04L 63/1441* (2013.01); *G06F 17/30598* (2013.01); *G06F 21/554* (2013.01); *H04L 63/0236* (2013.01); *H04L 63/1416* (2013.01); *H04L 63/1425* (2013.01); *H04L 63/1433* (2013.01); *H04L 63/20* (2013.01); *H04L 47/2425* (2013.01)

(58) Field of Classification Search
CPC ............................ H04L 63/1441; G06F 21/554
See application file for complete search history.

(56) References Cited

U.S. PATENT DOCUMENTS

| | | | |
|---|---|---|---|
| 8,042,171 B1 * | 10/2011 | Nordstrom | H04L 63/1441 726/13 |
| 8,185,953 B2 | 5/2012 | Rothstein et al. | |
| 8,261,317 B2 | 9/2012 | Litvin et al. | |
| 8,291,495 B1 | 10/2012 | Burns et al. | |

(Continued)

OTHER PUBLICATIONS

Paudice, Andrea; Sarkar, Santonu; Cotroneo, Domenico; "An Experiment with Conceptual Clustering for the Analysis of Security Alerts", IEEE International Symposium on Software Reliability Engineering Workshops, Nov. 3-6, 2014, pp. 335-340.*

(Continued)

*Primary Examiner* — Victor Lesniewski (57) ABSTRACT

Systems, methods, and software described herein provide security actions to computing assets of a computing environment. In one example, a method of operating an advisement system to manage security actions for a computing environment includes identifying a security incident for an asset in the environment, and obtaining enrichment information about the security incident. The method further includes identifying a rule set based on the enrichment information, identifying an action response based on the rule set, and initiating implementation of the action response in the computing environment.

14 Claims, 5 Drawing Sheets

(56) References Cited

U.S. PATENT DOCUMENTS

| | | | |
|---|---|---|---|
| 8,627,466 B2* | 1/2014 | Fisher | G06F 21/554 726/22 |
| 8,856,910 B1* | 10/2014 | Rostami-Hesarsorkh | H04L 63/1408 713/153 |
| 8,914,878 B2 | 12/2014 | Burns et al. | |
| 8,949,931 B2 | 2/2015 | Ermagan et al. | |
| 9,049,226 B1* | 6/2015 | Duane | H04L 63/1441 |
| 9,166,995 B1* | 10/2015 | Roundy | H04L 63/1441 |
| 9,256,739 B1* | 2/2016 | Roundy | G06F 21/554 |
| 9,325,733 B1* | 4/2016 | Kolman | H04L 63/1441 |
| 9,489,516 B1* | 11/2016 | Lu | G06F 21/566 |
| 2004/0003286 A1* | 1/2004 | Kaler | G06F 21/554 726/25 |
| 2004/0111637 A1 | 6/2004 | Baffes et al. | |
| 2005/0055578 A1* | 3/2005 | Wright | G06F 21/32 726/4 |
| 2006/0048209 A1* | 3/2006 | Shelest | G06F 21/554 726/1 |
| 2006/0117386 A1 | 6/2006 | Gupta et al. | |
| 2008/0289028 A1* | 11/2008 | Jansen | H04L 63/0281 726/11 |
| 2010/0162347 A1 | 6/2010 | Barile | |
| 2013/0081141 A1* | 3/2013 | Anurag | G06F 21/55 726/23 |
| 2013/0291106 A1* | 10/2013 | Simonoff | G06F 21/552 726/23 |
| 2014/0259170 A1 | 9/2014 | Amsler | |
| 2014/0310811 A1* | 10/2014 | Hentunen | H04L 63/1441 726/23 |
| 2014/0344926 A1* | 11/2014 | Cunningham | H04L 63/1441 726/22 |
| 2015/0215325 A1 | 7/2015 | Ogawa | |
| 2015/0222647 A1* | 8/2015 | Lietz | H04L 63/1416 726/23 |
| 2015/0341384 A1* | 11/2015 | Mandayam | H04L 63/1466 726/23 |
| 2015/0365438 A1* | 12/2015 | Carver | H04L 63/1441 726/1 |
| 2016/0072836 A1* | 3/2016 | Hadden | H04L 63/1441 726/23 |
| 2016/0103992 A1* | 4/2016 | Roundy | G06F 21/554 726/23 |
| 2016/0119379 A1 | 4/2016 | Nadkarni | |
| 2016/0164893 A1 | 6/2016 | Levi | |

OTHER PUBLICATIONS

Aguirre, Idoia; Alonso, Sergio; "Improving the Automation of Security Information Management: A Collaborative Approach", IEEE Security & Privacy, vol. 10, Issue 1, Oct. 25, 2011, pp. 55-59.*

* cited by examiner

AUTOMATED RESPONSES TO SECURITY THREATS

RELATED APPLICATIONS

This application is related to and claims priority to U.S. Provisional Patent Application No. 62/087,025, entitled "ACTION RECOMMENDATIONS FOR COMPUTING ASSETS BASED ON ENRICHMENT INFORMATION," filed on Dec. 3, 2014, U.S. Provisional Patent Application No. 62/106,830, entitled "ACTION RECOMMENDATIONS FOR ADMINISTRATORS IN A COMPUTING ENVIRONMENT," filed on Jan. 23, 2015, and U.S. Provisional Patent Application No. 62/106,837, entitled "SECURITY ACTIONS IN A COMPUTING ENVIRONMENT," filed on Jan. 23, 2015, and which are hereby incorporated by reference in their entirety.

TECHNICAL FIELD

Aspects of the disclosure are related to computing environment security, and in particular to implementing security actions in a computing environment.

TECHNICAL BACKGROUND

An increasing number of data security threats exist in the modern computerized society. These threats may include viruses or other malware that attacks the local computer of the end user, or sophisticated cyber attacks to gather data and other information from the cloud or server based infrastructure. This server based infrastructure includes real and virtual computing devices that are used to provide a variety of services to user computing systems, such as data storage, cloud processing, web sites and services, amongst other possible services. To protect applications and services, various antivirus, encryption, and firewall implementations may be used across an array of operating systems, such as Linux and Microsoft Windows.

Further, some computing environments may implement security information and event management (SIEM) systems and other security detection systems to provide real-time analysis of security alerts generated by network hardware and applications. In particular, SIEM systems allow for real-time monitoring, correlation of events, notifications, and console views for end users. Further, SIEM systems may provide storage logs capable of managing historical information about various security events within the network. Although SIEMs generate security alerts for devices within the network, administrators may be forced to translate each of these alerts into particular actions. Thus, time and resources that could be used on other tasks may be used in researching and determining an appropriate course of action to handle a security threat. Further, difficulties may arise when an administrator is unavailable or unable to respond to a security incident when the incident occurs.

OVERVIEW

The technology disclosed herein enhances how security actions are administered within a computing environment. In at least one implementation, an advisement system that manages actions against security threats, obtains a report of a security incident for an asset in the computing environment. Responsive to the report, the advisement system retrieves enrichment information about the security incident from internal and external sources, and determines a rule set for the security incident based on the enrichment information. The advisement system further identifies an action response for the security incident based on the rule set, and initiates implementation of the action response in the computing environment.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Security systems, such as security information and event management (SIEM) systems, provide real-time analysis of security alerts generated by network hardware and processes. The network hardware and processes may include routers, firewalls, operating systems and applications executing on one or more computing devices, switches, or intrusion detection systems, amongst a variety of other network devices and processes. During the analysis of the particular network, a SIEM system may identify an issue and flag the issue as a possible security threat. Once flagged, the SIEM system may provide information to an administrator, or store information about the threat to be analyzed for a possible solution.

Here, in addition to the operations provided by the SIEM system or other security monitoring systems within a computing environment, an advisement system may be used to identify, implement, and recommend security actions to be taken against security threats. For example, if a SIEM system identified a possible security threat within an asset of a computing environment, information about the threat could be transferred to the advisement system, supplementary information about the threat could be identified, and a default action could be taken against the threat based on a preconfigured rule set. This action may include a variety or procedures that eliminate, segregate, monitor, or provide other similar actions on the identified threat.

In some implementations, security threats may require timely default actions to prevent or at least limit the amount of harm a security threat may incur on the computing environment. Accordingly, rather than supplying information about the security incident and waiting for the administrator to select the course of action, the advisement system may initiate implementation of a default action that is preconfigured for the security threat and asset. This default action may be based on the severity of the security incident, the type of the security incident, which may include malware, viruses, or some other type of security incident, and may further be based on the criticality of the affected asset.

For example, a serving computing asset may have a different default action than an end user computing asset. To implement the default action, one or more data structures may be generated and accessible to the advisement system allowing the advisement system to relate an action to the type of asset and the type of security threat. The default action may include taking a snapshot of the affected computing asset, segregating the asset from other assets, removing an application related to the incident, blocking a particular internet protocol address related to the incident, or providing any other similar action to protect assets in the environment from the security incident.

In some examples, although a default action may be implemented within the environment, an administrator may also be provided with one or more action recommendations based on the rule set. These recommendations may allow the administrator to verify the use of the default action or, in the alternative, allow the user to replace the first action with a second more desirable action. For example, a default action for an affected computing asset may include segregating the affected computing asset from other computing assets in the environment, however, based on the administrator analysis, the administrator may choose to remove an undesired application from the affected computing asset. As a result, in response to the administrator selecting to remove the application, the advisement system may initiate the removal of the selected application, and reverse the operation to segregate the affected computing asset.

Figure 1:
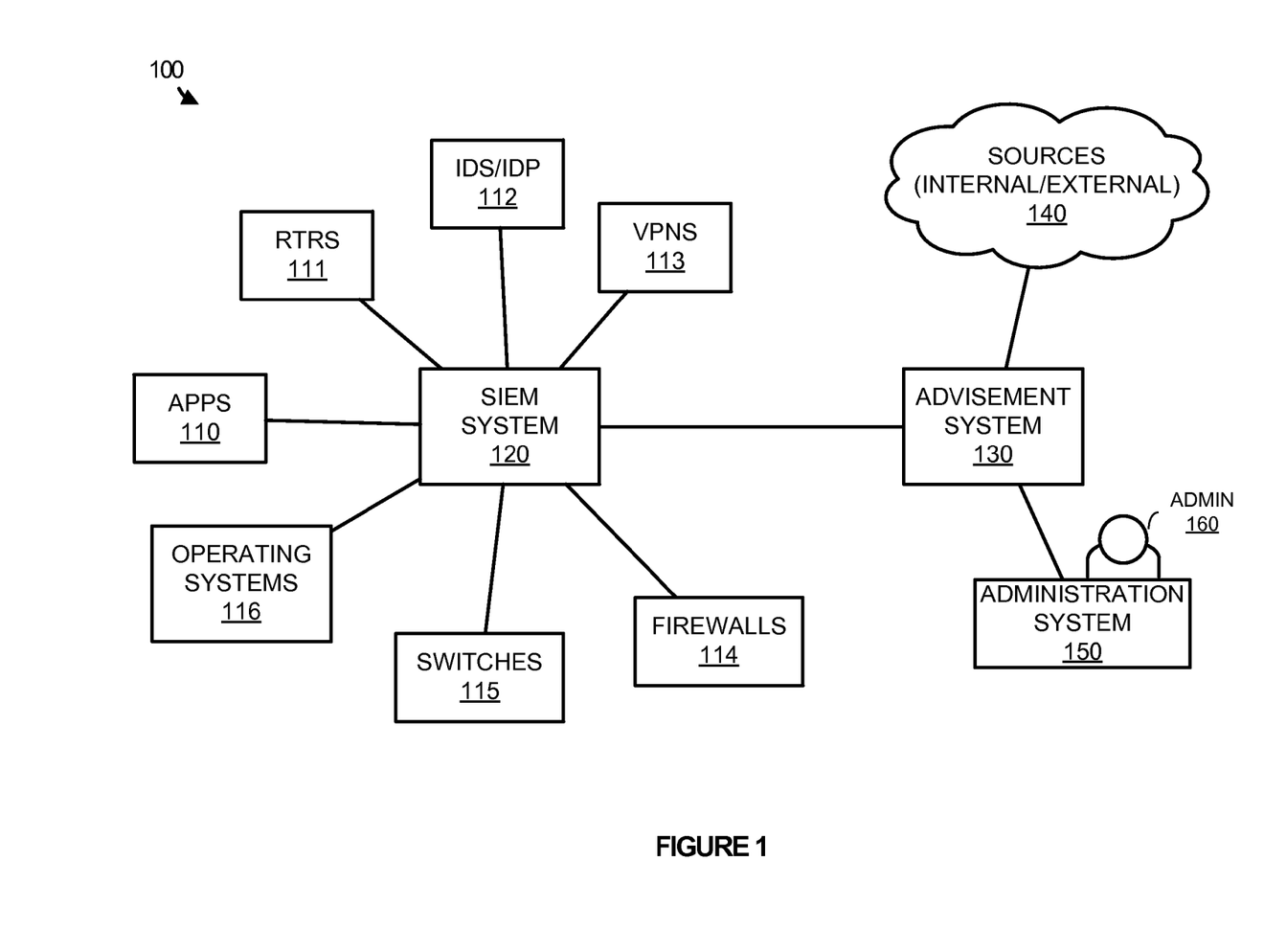
FIG. 1 illustrates a computing environment to manage security actions for a plurality of network assets.

To further illustrate the operation of an advisement system within a computing network, FIG. 1 is provided. FIG. 1 illustrates a computing environment 100 to manage security actions for a plurality of network assets. Computing environment 100 includes computing assets 110-116, SIEM system 120, advisement system 130, sources 140, and administration system 150. Computing assets 110-116 include applications 110, routers 111, intrusion detection systems and intrusion prevention system (IDS/IDP) 112, virtual private networks (VPNs) 113, firewalls 114, switches 115, and operating systems 116, although other assets may exist. Assets 110-116 may execute via any number of computing systems or devices. In addition to the routers and switches, these computing devices may include server computers, desktop computers, laptop computers, tablet computers, and the like. Although not illustrated in the present example, in some implementations, assets may be defined at computing system level. Accordingly, assets may be defined as servers, end user computing systems, host computing systems, and the like that may each include an operating system, applications, processes, firewalls, and the like.

SIEM system 120, advisement system 130, internal and external sources 140, and administration system 150 may each include communication interfaces, network interfaces, processing systems, computer systems, microprocessors, storage systems, storage media, or some other processing devices or software systems, and can be distributed among multiple devices. SIEM system 120, advisement system 130, and sources 140 may comprise one or more server, desktop, laptop, or other similar computing devices. Administration system 150 may comprise an end user device, such as a desktop computer, laptop computer, smartphone, tablet, or any other similar computing device.

Advisement system 130 communicates with SIEM system 120, sources 140, and administration system 150 via communication links that may use Time Division Multiplex (TDM), asynchronous transfer mode (ATM), internet protocol (IP), Ethernet, synchronous optical networking (SONET), hybrid fiber-coax (HFC), circuit-switched communication signaling, wireless communications, or some other communication format, including combinations and improvements thereof. Similarly, SIEM system 120 may gather information from assets 110-116 via a plurality of communication links to the computing systems associated with the assets, wherein the links may use TDM, ATM, IP, Ethernet, SONET, HFC, circuit-switched communication signaling, wireless communications, or some other communication format, including combinations and improvements thereof. While not illustrated in the present example, it should be understood that advisement system 130 might communicate with the assets over various communication links and communication formats to implement desired security actions.

In operation, SIEM system 120 receives data and performance information from assets 110-116 and performs inspections to identify possible security issues. Once SIEM system 120 identifies a possible security threat, information about the security threat is transferred to advisement system 130. Advisement system 130 identifies the security threat and analyzes the threat using sources 140 to determine actions against the security threat. These actions might include default actions that can be initiated and implemented within the environment without interaction from an administrator, and might further include suggested actions that can be provided to administrator (admin) 160. Once the suggested actions are determined, the suggested actions are transferred, via email, text message, or other similar format, to administration system 150 to be presented to administrator 160. From the suggested actions, administrator 160 may select a particular action and advisement system 130 may implement the action within the computing environment.

In some examples, it may be beneficial to classify each of the assets or computing systems into particular groups. For instance, assets may be grouped together based at least on their "traffic flow" or the rate and duration of inbound and outbound connections from each asset. This traffic flow may be used to classify each asset as a consumer, if the asset has a large amount of inbound activity, or a provider, if the asset has a large amount of outbound activity. The traffic flow determination for each of the assets in the system may be determined during normal operations, allowing advisement system 130 to make better action determinations. For example, if the asset is classified as a consumer, the action suggestion may include blocking inbound activity to the affected system, whereas if the asset is classified as a provider, the action suggestion may include blocking outbound activity. Thus, based at least partially on the normal operation connections and communications for the asset, advisement system 130 may determine actions for the device.

Similarly, in some examples, agents on each of the computing devices or systems within a computing environment may maintain a record or profile of the incoming and outgoing messages for each of the devices and systems. This profile may include internet protocol (IP) addresses involved in the communications, the amount of data transferred, the number of connections made, the type of data transferred, or any other communication related information. Based on this information, when an attack or infection is identified for the system, any communications that appear abnormal compared to the profiled communications may be prohibited. For example, if a threat is identified for a computing system, either internally or externally to the computing system, the advisement system may rely on the profile information to determine which of the communications are permitted. In some instances, the prohibited communications may include any communication that was recently added to the profile before the identification of the threat. For example, if a threat were identified for a computing system, any communication that was added to the profile in the previous day would not be permitted, as the new communications may be associated with the threat.

In another asset grouping example, assets may be classified as the source of an attack, a target of an attack, or an infrastructure component. Sources and targets may comprise endpoint IP addresses, users, files, computing systems, and the like, whereas the infrastructure may include firewalls, routers, switches, and other similar types of components. By grouping in this manner, actions may be recommended to prevent outgoing connections, incoming connections, or any other type of connection based on whether the asset is a source, a target, or an infrastructure element. In some examples, to determine whether an asset is a source or a target of an attack, the traffic flow may be analyzed before and after the identification of the attack. For example, if the device has a large amount of outbound connections, then the asset may be identified as the source of an attack. In contrast, if the device has an unusual inbound connection prior to the incident identification, then the asset may be identified as a target of an attack.

In addition to or in place of the aforementioned methods of grouping assets, in some examples, each of the assets may be given a criticality rating. This criticality rating may be defined by the administrator when the asset is added to the environment, may be based on the user or type of data that is associated with the particular asset, or can be based on any other similar mechanism. Once defined, the assets that are defined as more critical may be provided to a different administrator, flagged as more important when presented to an administrator, provided with a different rule set or actions, placed at a higher priority than other possible issues within the same environment, or any other similar action based on the criticality rating for the asset.

Figure 2:
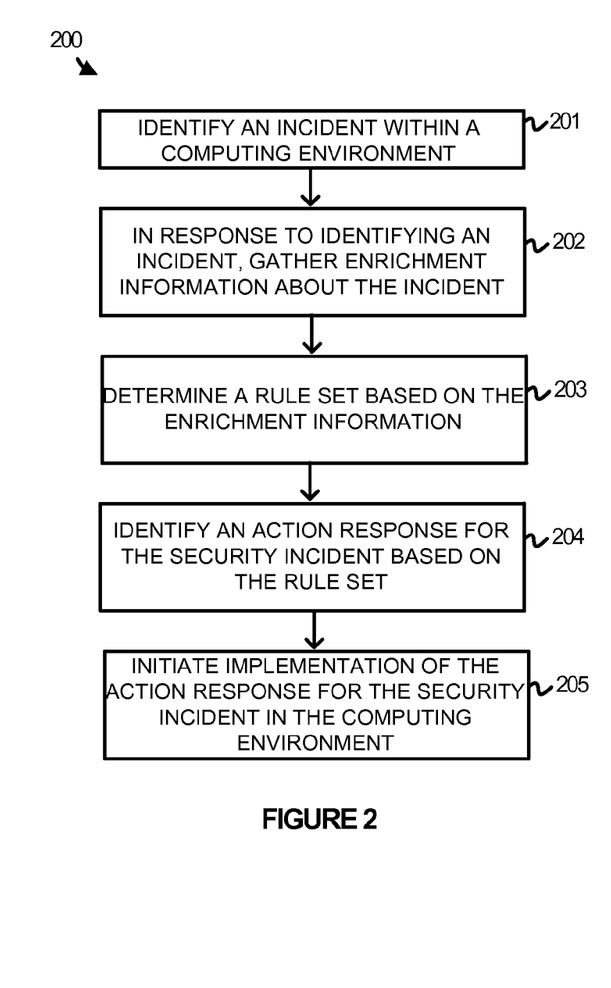
FIG. 2 illustrates a method of operating an advisement system to manage security actions for a plurality of network assets.

To further demonstrate the operation of computing environment 100, FIG. 2 is provided. FIG. 2 illustrates a method 200 of operating advisement system 130 to manage security actions for a plurality of network assets. In particular, as described in FIG. 1, SIEM system 120 receives information from a plurality of network assets 110-116 and identifies security threats to devices and systems based on the information. Once a threat is identified, the threat is then transferred to advisement system 130. Advisement system 130 identifies the security threat or incident within computing environment 100 (201), and in response to identifying the incident, gathers enrichment information about the incident (202). Specifically, advisement system 130 may identify properties or traits of the incident, such as the IP address for the incident, the firewall involved in the incident, the computing device, the host, the user, any uniform resource locators (URLs) associated with the incident, or any other information specific to the security incident and asset. Once the properties are identified, advisement system 130 may identify information or characteristics related to the threat using internal and external sources 140. These sources may include databases or websites that keep track of malicious IP addresses or domain names, the type of threats presented from the particular domain names, identities of malware, Trojans, and viruses, amongst a variety of other information.

Upon identifying enrichment information related to a particular incident, advisement system 130 may determine a rule set based on the enrichment information (203). This rule set is related to the type of threat presented to the network and computing environment 100. For example, an unknown process executing on a computing asset may be identified as a security incident. Responsive to identifying the security incident, one or more databases, websites, and other similar sources may be queried to identify information about the process. Based on the result of these queries, a rule set may be identified that corresponds at least to the query results.

Once the rule set is determined, the process further includes identifying an action response for the security incident based on the identified rule set (204), and initiating implementation of the action response for the security incident in the computing environment (205). In some implementations, each of the rule sets may include or be associated with a particular default action to be taken within the environment. These actions may include taking a snapshot of the affected computing asset, segregating the asset from other assets, removing an application related to the incident, blocking a particular internet protocol address related to the incident, or providing any other similar action to protect assets in the environment from the security incident.

In some implementations, in addition to the default action, advisement system 130 may identify one or more action recommendations for an administrator based on the defined rule set, and provide the one or more action recommendations to administrator 160. To provide the action recommendations, the recommendations may be transferred to a console device, such as administration system 150, or may be displayed on advisement system 130 via a user interface. The actions recommended to the administrator may be used to verify the default action that was taken against the security issue, or may be used to replace the default action. Thus, the default action will be repealed within the environment, while the user selection is implemented in one or more of the assets.

In some instances, the default action may be implemented for a limited time period. This limited time period, or time to live (TTL), may be based on the criticality of the asset and/or a severity rating for the security incident. The criticality rating for an asset may be defined by an administrator when the computing asset is added to the environment, may be determined based on the data accessible by the computing asset, or may be determined by other similar means. For example, a computing system associated with an intern of an organization may be assessed a lower criticality rating than a computing system associated with financial officer of the organization. The severity rating may be specific to the incident itself and determined based on the enrichment information gathered about the incident. As a result, an unknown process that is verified to be malware may have a different TTL than a process that is not known to be malware.

In some implementations, the default and user defined actions may only be active within the environment for as long as they are necessary. Thus, when it is determined that an issue is no longer active in the asset, the security action may be revoked or removed from the computing environment. To determine whether the incident or threat is active, the advisement system may monitor connections from the undesired IP address, identify the execution of unwanted processes for the asset, or determine any other characteristic related to the operation of the security incident. For example, an action on a computing system with a malicious process may include segregating the computing system and removing the malicious process from the system. Once the malicious process is removed and no longer executing on the computing system, the advisement system may revoke the segregation action for the computing system, allowing the computing system to rejoin the computing environment.

In some examples, in response to an administrator selection of an action, the administrator may be guided, via a workflow by advisement system 130, to implement the suggested action across one or more of the assets within the environment. Alternatively, rather than requiring the user to step through each stage of implementing the desired action, advisement system 130 may be used to automate the implementation of a particular action. For example, if one of the actions would take a long period of time to accomplish the necessary action steps, advisement system 130 may be configured to initiate the next step to an action when a previous step is complete. Thus, the user may not need to wait for each step to be completed. Further, although a user may make an initial action recommendation, it should also be understood that advisement system 130 might also provide an interface for which the administrator may repeal a particular action. For instance, if an initial action quarantined a particular computing device, advisement system 130 may provide the user with the necessary workflow process to rejoin the computing device to the organization network.

In some instances, to provide the action recommendations, advisement system 130 may identify the kill-chain or the current state of the incident within the computing environment. These kill-chain states may include a reconnaissance state to determine the type of information in the system, an exploit state to undermine the operation of the system, a persist state to remain in operation on the infected system, a lateral state to attempt to infect other systems connected to the network, a data extrusion state to remove data from the infected system, or any other type of infected state for the system. Based on the current state, advisement system 130 may provide appropriate action recommendations for the system. For example, if it is determined that a computing system is in the lateral state, advisement system 130 may recommend or act automatically to segregate the device from other systems on the network to prevent the other systems from being infected.

Turning to the implementation of the actions within the network, in some examples, firewall rules and file hash blacklists are used to prevent improper communication between computing devices. Accordingly, if a system is infected, an action may include implementing, in the firewall for the system, a rule that prevents outbound communications to other devices and assets within the computing environment. However, because the computing device is infected, it may not be possible for the firewall to prevent all outbound messages. Thus, rather than only implementing a change in the infected system firewall, the firewalls on the other systems and devices in the computing environment may also be configured to prevent inbound messages from the infected system's IP address. In some examples, to determine which firewalls to configure, the advisement system may monitor the traffic flow to and from the infected or attacked computing system. Thus, any system or device that communicates with the infected system may be prevented from communicating with the system in the future.

In addition to or in place of the firewall rule implementations described above, other actions may also be taken to allow various devices to continue to communicate with an attacked or infected system. For instance, a computing system may require availability to accomplish various tasks within the network. This high availability system may include a database system, a file storage system, or some other similar system. To keep the system available, endpoint systems, such as user systems, can reach the system and access the necessary service, while the infected system is blocked from initiating outbound connections. Thus, an active attack on the infected system is unable to jump or transfer to other systems, but the necessary services are still operational.

Although illustrated in FIG. 1 with a SIEM system, it should be understood that in some examples the assets themselves within the computing environment might be used to identify security threats. Further, although illustrated separate in the instance of FIG. 1, it should be understood that SIEM system 120 might reside wholly or partially on the same computing systems or devices as advisement system 130. As discussed previously, in addition to providing action recommendations to administration system 150, advisement system 130 may implement default actions that are either permanent or temporary. For example, if an asset were marked as critical, the default action may be used to quickly quarantine the affected computing asset. However, once an administrator reviews the threat or attack, the administrator may verify the implementation of the default action or implement a different action, as they deem necessary.

Figure 3:
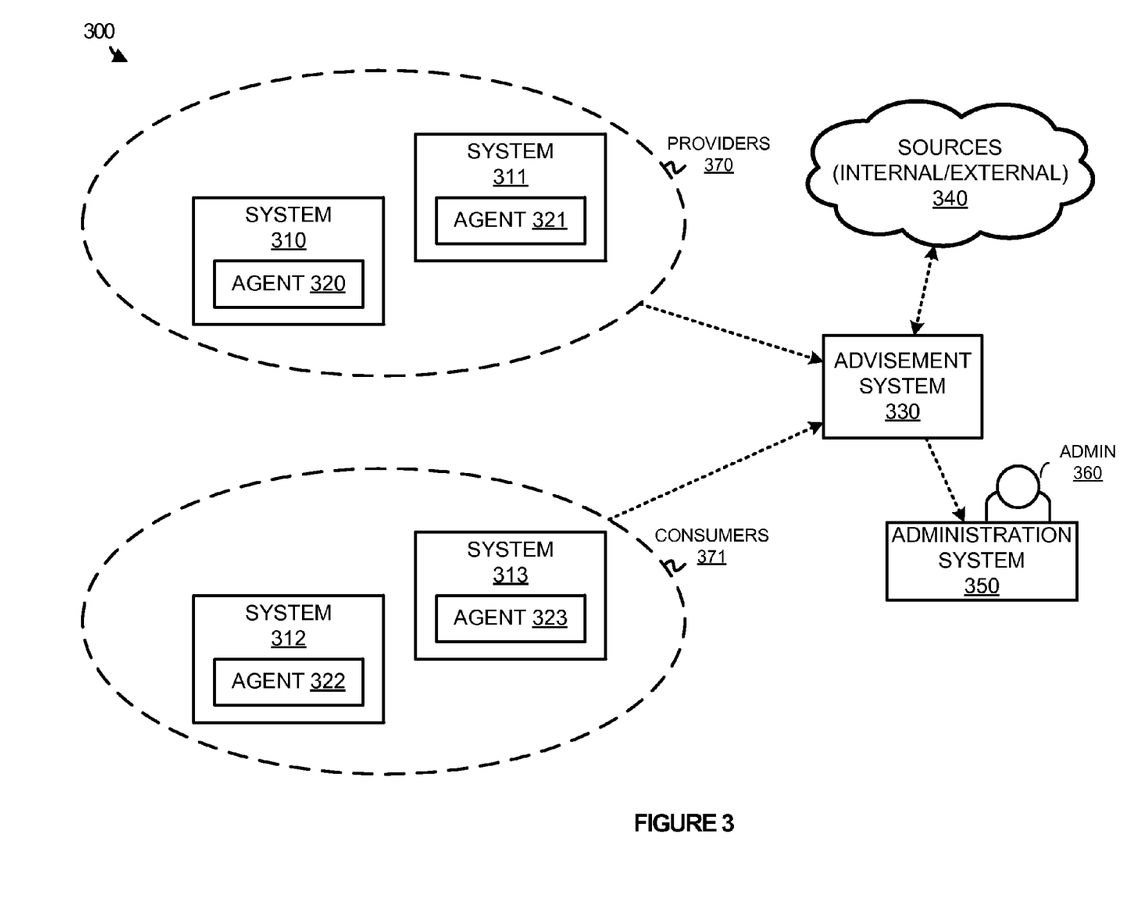
FIG. 3 illustrates an overview of providing actions to security threats based on connection history.

To further demonstrate the process of generating actions for security incidents, FIG. 3 is included. FIG. 3 illustrates an overview 300 of providing actions to security threats based on connection history. Overview 300 includes systems 310-313 with agents 320-323, advisement system 330, sources 340, and administration system 350 corresponding to administrator 360. Providers 370 are used to group or identify systems 310-311, and consumers 371 are used to group or identify system 312-313. Systems 310-313 may comprise serving computing systems, desktop computing systems, laptop computing systems, and other similar computing systems, including combinations and virtual representations thereof. Systems 310-313 are examples of assets within a computing environment according to one example.

As described herein, organizations may employ a large computing environment with a plurality of routers, switches, and computing systems. To ensure that the systems within the environment operate as desired, threat identifiers, such as SIEM systems or threat identifiers on the individual systems, and advisement systems may be employed to identify possible security issues within the system, and recommend actions to remedy the identified issues. Here, to assist in providing actions to the affected systems, systems 310-313 are placed into groups based on the normal operation of the system.

For example, systems 310-311 are classified as providers because a majority of the connections made from systems 310-311 are outbound, whereas systems 312-313 are classified as consumers because a majority of their connections are inbound. To make these determinations, agents 320-323 are included on the systems to track connection or data communication information for the systems during normal operation. This connection information may include which systems are contacted by the system, the amount of data provided in each communication, the number of communications made to each of the systems, or any other similar type of information.

Once an issue is identified within the environment, advisement system 330 is configured to query sources 340 to identify enrichment information or characteristics about the particular issue. Upon receiving the enrichment information advisement system 330 may employ a default action based on a preconfigured rule set, or may provide action recommendations to administration system 350. In response to receiving the action recommendations, administrator 360 may select an action and be provided the workflow to implement the action within the environment. In other instances, advisement system 330 may implement the actions without requiring the user for each step of the implementation process.

In the present example, the actions that are implemented by default or by the selection of administrator 360 may be based on the traffic flow information gathered by agents 320-323 on systems 310-313. Accordingly, rather than implementing a security action within a single system, multiple systems may be modified based on their interactions. For example, advisement system 330 may identify a security threat within system 310. In response to the threat, the rule set may prescribe an action to prevent all outgoing connections from system 310. Additionally, any system that may receive a connection from system 310 may also implement a firewall change to stop all incoming connections from the IP address associated with system 310. Thus, in addition to the actions taken against the system or asset with the issue, advisement system 330 may also implement actions in other systems as a failsafe against possible malicious operations in the system.

Although illustrated as being grouped as providers and consumers in the present example, it should also be understood that other groupings are possible for the systems and devices within the computing environment. For example, an administrator may specify at the time the systems are initiated within the computing environment a criticality rating to each of the devices. This criticality rating may come as scale of numbers, letters, or some other scale to determine the criticality for each of the systems. Accordingly, because criticality may be assessed to each of the systems individually, a computing system that is provided to financial advisor may have a higher level of priority or criticality than a system that is provided to an intern. Thus, if an issue is found within one of the critical systems, a different rule set may be used to define the actions, which may include raising critical asset issue ahead of other assets, providing the action recommendations for the critical asset to a different administrator, or some other action that can be taken based on the criticality of each of the systems.

Despite being illustrated in the present example with four computing systems, it should be understood that any number of computing system might be employed within the computing environment. Moreover, in addition to the computing systems, various routers, switches, and other networking devices may be employed to assist in the interaction and connection of the computing systems to each other and outside networks.

Figure 4:
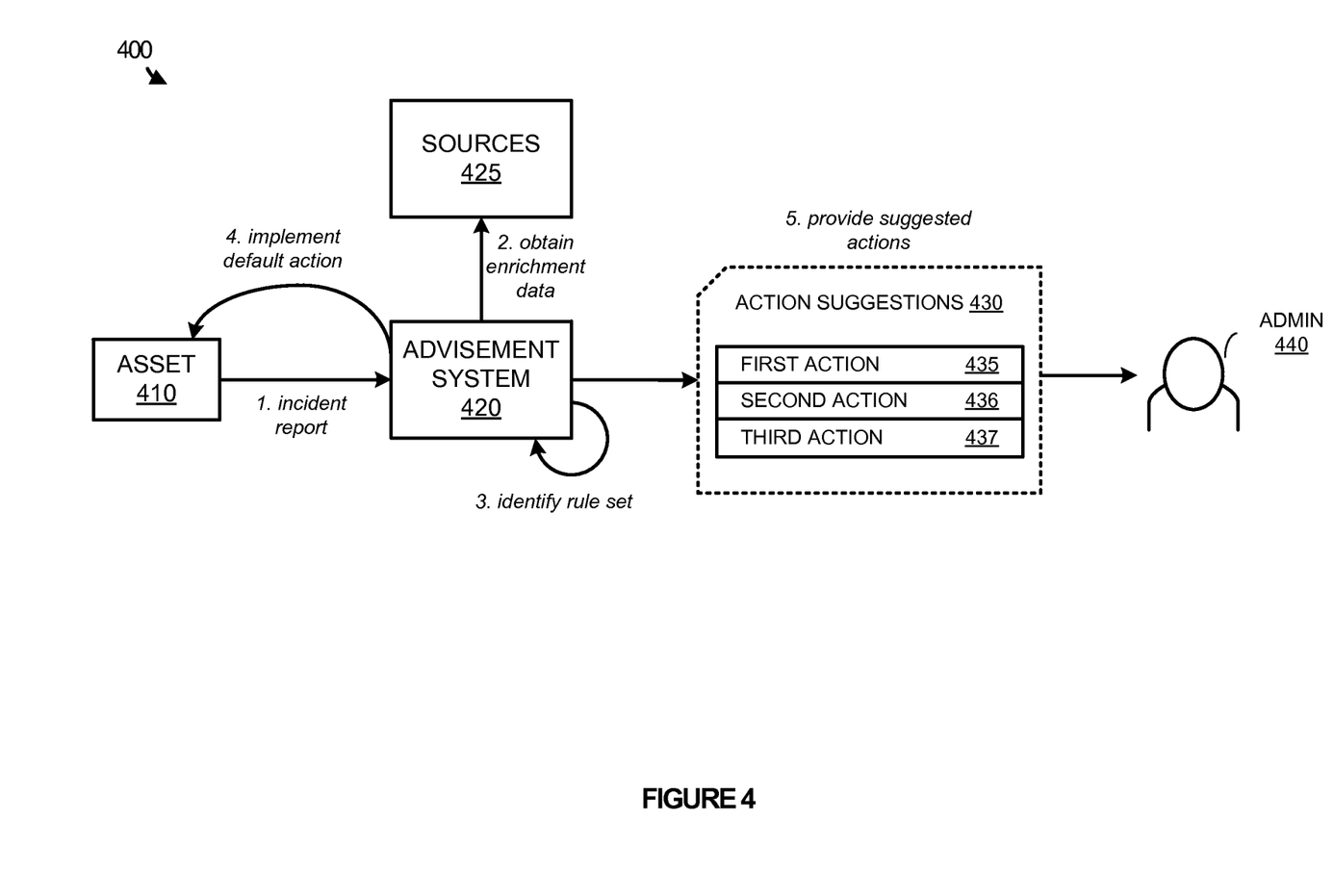
FIG. 4 illustrates an operational scenario of identifying and implementing a default security action according to one example.

To further demonstrate the implementing of default actions for a computing environment, FIG. 4 is provided. FIG. 4 illustrates an operational scenario 400 of identifying and implementing a default security action according to one example. Operational scenario 400 includes asset 410, advisement system 420, sources 425, action suggestions 430, and administrator 440. As described herein assets may comprise operating systems, virtual machines, application files, routers, switches firewalls, or any other similar asset. Further, in some examples, assets may be defined as an entire computing system, such as a server or personal computing system, which includes an operating system, files, applications, and processes.

As described herein, security systems and processes, such as SIEM systems, are configured to identify possible security incidents within a computing environment that includes a plurality of computing systems and assets. Here, asset 410 is identified with a security incident, and the report is transferred to advisement system 420. This incident report may be generated by an agent that is collocated on the same computing system or device as asset 410, or may be generated by an external system such as a SIEM that reports the incident to advisement system 420.

In response to the incident report, advisement system 420 obtains enrichment data from sources 425, which may comprise databases, webpages, or other resources that store information about security threats. For example, a database may be maintained that includes recently identified malware applications. Accordingly, if the incident report indicated an unknown application executing on an asset, the unknown application may be compared to the identified malware applications of the database to determine a rule set for the unknown application. In some implementations, to manage the various rule sets for the advisement system, one or more data structures may be accessible by the advisement system that relates rule sets to asset types and enrichment information about the incident. For example, an incident may be reported for an unknown process executing on a virtual machine asset. Once enrichment information is gathered about the unknown process, the advisement system may identify a rule set that applies to virtual machines, unknown processes, and the enrichment information determined about the unknown process. Accordingly, an unknown process that is known to be malicious from the enrichment information may be associated with a different rule set than an unknown process that cannot be confirmed to be malicious.

Upon determining the rule set for the security incident, a default action is identified and implemented based on the rule set. In some examples, the rule set may include a default action that should be taken on one or more of the assets within the environment. For example, if an unknown process were executing on an asset, the default action may include the necessary procedures to sandbox or segregate the computing system with the process from other assets within the environment. In some implementations, the computing systems and software within the computing environment may be produced by a plurality of manufacturers and suppliers. As a result, the method for removing an application or providing any other security action on a first system may be different than providing the security action on a second system. To remedy this issue, advisement system 420 may be configured to implement the desired actions for each individual manufacturer or producer of the hardware and software within the computing environment.

In some implementations, advisement system 420 may further be configured to identify and provide action suggestions 430 based on the identified rule set to administrator 440. Action suggestions 430 may be provided locally on advisement system 420 via a user interface, or may delivered to a remote console device such as a desktop, laptop, tablet, or some other device for display to administrator 440. Action suggestions 430 may include the default action that was taken against the security incident as well as one or more other actions that could be taken against the incident. Action suggestions 430 may include, but are not limited to, removing a process associated with the incident, segregating a computing system associated with the incident, blocking a particular IP address that is associated with the incident, or taking a snapshot of a computing asset related to the incident.

Once presented to administrator 440, the administrator may select one or more of the actions to be implemented within the environment. If the administrator selects or verifies the default action, then the default action will remain in place within the computing environment. In contrast, if the administrator selects a different action from the default action, the default action will be removed and the selected action will be implemented within the environment. For example, if first action 435 were the default action taken by advisement system 420, but administrator 440 selected second action 436, first action 435 would be reversed, and second action 436 would be implemented in the environment.

In some implementations, advisement system 420 may, upon selection of an action by administrator 440, guide administrator 440 through the workflow or process of implementing the action for asset 410. In other implementations, advisement system 420 may include preconfigured connectors or configurations that allow advisement system 420 to automate the process of implementing the selected security action. For example, if administrator 440 selected to block a particular IP address on a computing asset, advisement system 420 may be configured with the necessary actions to log in to the computing asset and implement the block IP address command on the asset.

In some implementations, the default action may be implemented for a limited time period. This time period, or TTL, may be based on the criticality of the asset and/or a severity rating for the security incident. The criticality rating for an asset may be defined by an administrator when the computing asset is added to the environment, may be determined based on the data located on or accessible by the computing asset, or may be determined by any other similar method. For example, a computing system associated with an intern of an organization may be assessed a lower criticality rating than a computing system associated with a financial officer of the organization. Thus, the TTL on the default action may be shorter for the financial officer computing system to ensure an administrator addresses the security issue. Unlike the criticality rating, the severity rating may be specific to the incident itself and determined based on the enrichment information gathered about the incident. As a result, an unknown process that is verified to be malware may be provided a shorter TTL than a process that is verified to not contain malware.

In some examples, the default and user defined actions may only be active within the environment for as long as they are necessary. Thus, when it is determined that an issue is no longer active in the asset, the security action may be revoked or removed from the computing environment. To determine whether the incident or threat is active, the advisement system may monitor connections from the undesired IP address, identify the execution of unwanted processes for the asset, or determine any other characteristic related to the operation of the security incident. For example, an action on a computing system with a malicious process may include segregating the computing system and removing the malicious process from the system. Once the malicious process is removed and no longer executing on the computing system, the advisement system may revoke the segregation action for the computing system, allowing the computing system to rejoin the computing environment.

In some implementations, the time period that is provided for the default action may be included in the action recommendations that are provided to the administrator, allowing the administrator to identify the amount of time to implement a user defined action. Upon expiration of the time period, advisement system 420 may revoke the default action, or provide a secondary action, which may further limit the operations of the affected asset or be more conservative than the initial action.

Although described as providing a TTL for the default action in the present example, it should be understood that in some instances the user-defined action might also include a TTL. This TTL may ensure that the administrator revisits or provides secondary input regarding the incident. Further, supplemental enrichment information may be determined for the incident prior to the second input, allowing advisement system 420 to provide a new or modified version of action suggestions 430 to administrator 440.

In some implementations, the default action for asset 410 may only be implemented if input is not received from administrator 440. Accordingly, action suggestions 430 may be provided to administrator 440 with a time period for which the administrator has to respond. If the administrator does not respond in the defined time period, advisement system 420 may implement the default action until the administrator provides a selection from the suggested actions.

Figure 5:
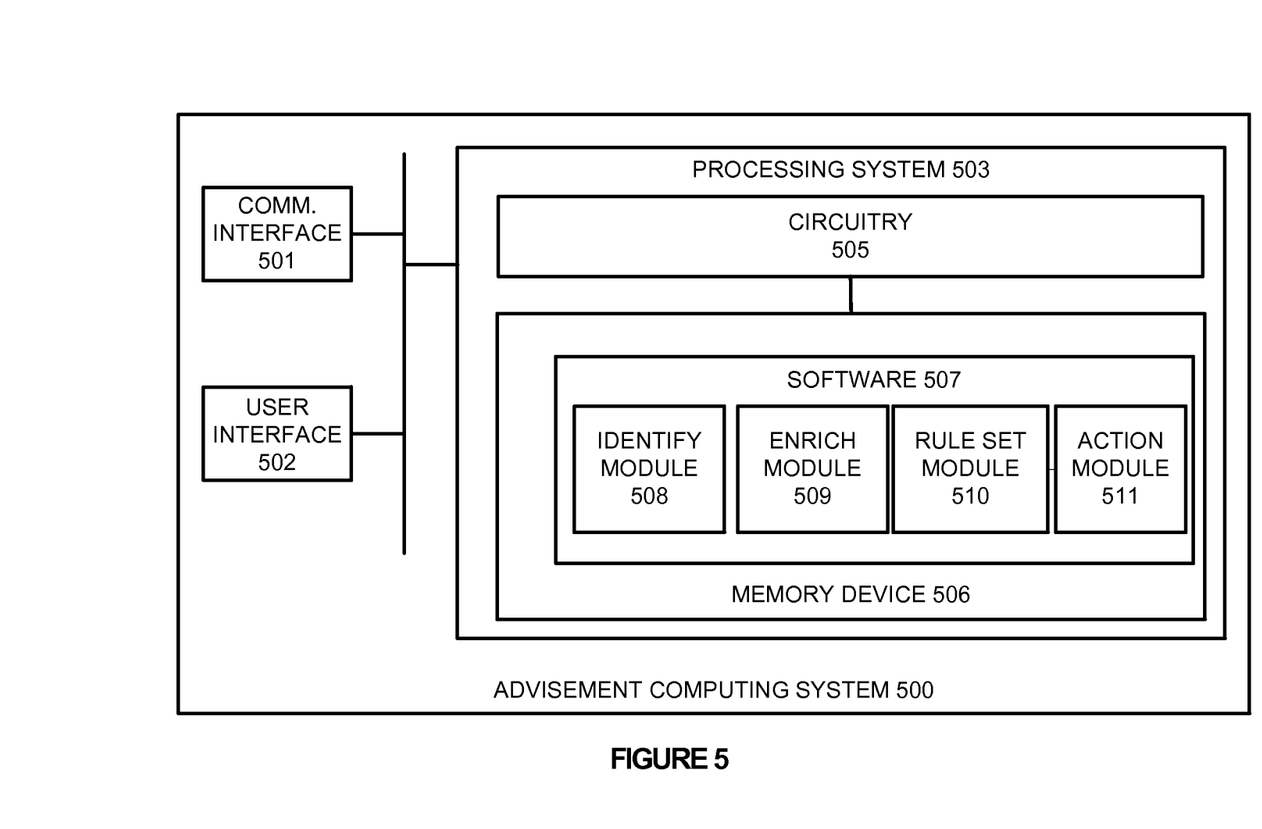
FIG. 5 illustrates an advisement computing system manage security actions for a plurality of network assets.

Turning to FIG. 5, FIG. 5 illustrates an advisement computing system 500 to provide action recommendations for a plurality of network assets. Advisement computing system 500 is representative of a computing system that may be employed in any computing apparatus, system, or device, or collections thereof, to suitably implement the advisement systems described herein. Computing system 500 comprises communication interface 501, user interface 502, and processing system 503. Processing system 503 is communicatively linked to communication interface 501 and user interface 502. Processing system 503 includes processing circuitry 505 and memory device 506 that stores operating software 507.

Communication interface 501 comprises components that communicate over communication links, such as network cards, ports, RF transceivers, processing circuitry and software, or some other communication devices. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof. In particular, communication interface 501 may communicate with a SIEM system or other systems that gather security incident information from a plurality of assets within a computing environment. Communication interface 501 may be configured to communicate with one or more administration systems to provide action recommendations to administrators, and may be configured to communicate with one or more computing system assets in the computing environment to initiate implementation of security actions.

User interface 502 comprises components that interact with a user. User interface 502 may include a keyboard, display screen, mouse, touch pad, or some other user input/output apparatus. User interface 502 may be omitted in some examples.

Processing circuitry 505 comprises microprocessor and other circuitry that retrieves and executes operating software 507 from memory device 506. Memory device 506 comprises a non-transitory storage medium, such as a disk drive, flash drive, data storage circuitry, or some other memory apparatus. Operating software 507 comprises computer programs, firmware, or some other form of machine-readable processing instructions. Operating software 507 includes identify module 508, enrichment module 509, rule set module 510, and action module 511, although any number of software modules may provide the same operation. Operating software 507 may further include an operating system, utilities, drivers, network interfaces, applications, or some other type of software. When executed by circuitry 505, operating software 507 directs processing system 503 to operate advisement computing system 500 as described herein.

In particular, identify module 508 is configured to, when executed by advisement computing system 500 and processing system 503, identify a security incident for an asset within the computing environment. Once an incident is identified, enrichment module 509 obtains enrichment information for the security incident. This enrichment information may be gathered from sources internal to the computing environment, such as local servers and records, as well as external sources, such as websites and databases. For example, if an asset within the computing environment was connecting in an abnormal way to a particular IP address, enrichment module 509 may contact one or more sources to determine information about the unknown IP address. These sources may include information about whether the address is malicious, whether the address belongs to a particular entity, or any other similar information regarding the IP address.

Once the enrichment information is determined, rule set module 510 may determine a rule set for the security incident based on the enrichment information. Upon determining the rule set, action module 511 identifies a default action based on the rule set, and initiates implementation of the default action in one or more assets of the computing environment. In some examples, action module 511 may determine suggested security actions for an administrator based on the rule set. These suggestions may include suggestions to eliminate a malicious item related to the security incident, segregating the asset from other assets within the network, taking a snapshot of the computing system the computing system with the incident to provide further analysis on the incident, amongst a variety of other suggested security actions.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating an advisement system to provide default security actions in a computing environment, the method comprising:
    in a processing system of the advisement system, identifying a security incident for an asset in the computing environment, wherein the computing environment comprises a plurality of computing assets;
    in response to identifying the security incident, identifying enrichment information about the security incident from one or more databases;
    determining a rule set for the security incident based on the enrichment information;
    identifying an action response for the security incident based on the rule set;
    identifying a time period for the action response to be implanted in the computing environment;
    initiating implementation of the action response for the security incident in the computing environment;
    identifying one or more action recommendations for an administrator based on the rule set;
    providing the one or more action recommendations to the administrator of the computing environment;
    using the identified time period as a defined time period for which the administrator has to respond to the one or more action recommendations;
    determining whether a selection of the one or more action recommendations is provided by the administrator within the defined time period;
    if a selection is provided by the administrator within the defined time period, initiating implementation of the selection in the computing environment; and
    if a selection is not provided by the administrator within the defined time period, initiating a supplemental automated action in the computing environment for the security incident.

2. The method of claim wherein identifying the time period for the action response to be implemented in the computing environment comprises identifying the time period for the action response to be implemented in the computing environment based on at least one of a criticality rating of the asset or a severity rating for the security incident.

3. The method of claim 1 wherein initiating the supplemental automated action in the computing environment comprises initiating removal of the action response for the security incident in the computing environment.

4. The method of claim 1 wherein initiating the supplemental automated action in the computing environment comprises initiating a replacement of the action response with a second action response in the computing environment.

5. The method of claim 1 wherein initiating implementation of the selection in the computing environment comprises initiating implementation of the selection in place of the action response.

6. The method of claim 1 further comprising:
    identifying whether the security incident is no longer active within the computing environment after implementing the action response; and
    if the security incident is no longer active, initiating removal of the action response for the security incident in the computing environment.

7. The method of claim 1 wherein identifying the enrichment information about the security incident from one or more databases comprises inquiring the one or more databases and one or more websites to determine the enrichment information for the security incident.

8. A non-transitory computer readable storage medium having instructions stored thereon, that when executed by an advertisement computing system, direct the advertisement computing system to perform a method of providing default security actions in a computing environment comprising a plurality of assets, the method comprising:
    identifying a security incident for an asset in the computing environment;
    in response to in identifying the security incident, identifying enrichment information about the security incident from one or more databases;
    determining a rule set for the security incident based on the enrichment information;
    identifying an action response for the security incident based on the rule set;

identifying a time period for the action response to be implemented in the computing environment;

initiating implementation of the action response for the security incident in the computing environment;

identifying one or more action recommendations for an administrator based on the rule set;

providing the one or more action recommendations to the administrator of the computing environment;

using the identified time period as a defined time period for which the administrator has to respond to the one or more action recommendations;

determining whether a selection of the one or more action recommendations is provided by the administrator within the defined time period;

if a selection is provided by the administrator within the defined time period, initiating implementation of the selection in the computing environment; and if a selection is not provided by the administrator within the defined time period, initiating a supplemental automated action in the computing environment for the security incident.

9. The non-transitory computer readable storage medium of claim 8, wherein identifying the time period for the action response to be implemented in the computing environment comprises identifying the time period for the action response to be implemented in the computing environment based on a criticality rating of the asset or a severity rating for the security incident.

10. The non-transitory computer readable storage medium of claim 8, wherein initiating the supplemental automated action in the computing environment comprises initiating removal of the action response for the security incident in the computing environment.

11. The non-transitory computer readable storage medium of claim 8, wherein initiating the supplemental automated action in the computing environment comprises initiating a replacement of the action response with a second action response in the computing environment.

12. The non-transitory computer readable storage medium of claim 8, wherein initiating implementation of the selection in the computing environment comprises initiating implementation of the selection in place of the action response.

13. The non-transitory computer readable storage medium of claim 8, wherein the method further comprises:
   identifying whether the security incident is no longer active within the computing environment after implementing the action, response; and
   if the security incident is no longer active, initiating removal of the action response for the security incident in the computing environment.

14. The non-transitory computer readable storage medium of claim 8, wherein identifying the enrichment information about the security incident from one or more databases comprises inquiring the one or more databases and one or more websites to determine the enrichment information for the security incident.

* * * * *